Patented Sept. 22, 1925.

1,554,641

UNITED STATES PATENT OFFICE.

CARL S. MINER, OF CHICAGO, ILLINOIS, ASSIGNOR TO THE QUAKER OATS COMPANY, OF CHICAGO, ILLINOIS, A CORPORATION OF NEW JERSEY.

PRESERVATIVE FOR BIOLOGICAL MATERIALS AND PROCESS FOR PRESERVING BIOLOGICAL MATERIALS.

No Drawing.    Application filed September 7, 1922.    Serial No. 586,787.

*To all whom it may concern:*

Be it known that I, CARL S. MINER, a citizen of the United States, residing at Chicago, in the county of Cook and State of Illinois, have invented new and useful Improvements in Preservatives for Biological Materials and Processes for Preserving Biological Materials, of which the following is a full, clear, concise, and exact description.

My invention relates to improvements in preservatives for biological materials as well as to an improved process for preserving biological materials.

Heretofore chemical compounds or mixtures that have been employed as preservatives for biological materials or objects have deleteriously affected the anatomical structure and appearance of such objects which either have been immersed in or impregnated with the preserving chemicals. The chemical material usually employed for this purpose has been formaldehyde. While formaldehyde serves with a reasonable degree of efficiency as a preservative for biological materials and objects, it possesses several serious defects which, in some instances, render formaldehyde highly undesirable. For example, biological material, and particularly animal tissues, become hardened when preserved through the agency of formaldehyde. In this circumstance, specimens so preserved require considerable treatment before they can be used with any satisfaction for dissection or other similar purposes. Formaldehyde is furthermore very unsatisfactory because of its effect upon persons who come into contact with it by reason of its extremely unpleasant odor and its highly detrimental effect upon living tissues. In fact, there is a specific type of dermatitis that is very common among persons who work in the presence of formaldehyde.

An object of my invention, therefore, is to provide a preservative for biological material which will be devoid of the aforementioned defects and which will be very economical to produce and to use. My present preservative, as well as my present process for preserving biological material, is highly efficient in that animal tissues, besides being very satisfactorily preserved, are also preserved in substantially their original state. At the same time, my present invention provides a preservative for biological material, as well as a process for preserving biological materials, which do not affect deleteriously the persons who are utilizing or working with my preservative.

I have ascertained that the chemical furfural has the desirable quality of preserving biological materials without possessing any of the undesirable qualities of formaldehyde or other preservatives that have been heretofore used. I have found that a seven per cent solution of furfural indefinitely preserves biological material, and particularly animal matter and, at the same time, precludes the biological material from becoming hardened. Specimens preserved in my present preservative, as well as in accordance with my present process, possess muscles that remain as soft and pliable as in the living animal. Moreover, by the use of furfural as a preservative for biological materials or as the chief ingredient of an embalming fluid no deleterious action occurs on the mucous membranes of persons who are in close contact therewith. Moreover, the odor resulting from furfural is not as unpleasant and undesirable as the odors emitted from formaldehyde.

In practicing my process, the specimen may be either impregnated with a fluid of which the chief ingredient is furfural or may be immersed in a bath of preserving fluid comprising furfural. In my experiments I have ascertained that a seven per cent solution of furfural possesses highly desirable preserving qualities and does not deleteriously affect the structure or color of the animal specimen that is being preserved.

Specimens preserved in accordance with my invention may be readily dissected or prepared for exhibition or for burial with a minimum degree of time or attention.

It will be apparent from the foregoing that furfural is a very desirable preservative for many materials not specifically mentioned herein. For instance, I have found that furfural is a very convenient and economical preservative for glue liquors during the process of manufacturing glue.

While I have described an embodiment of my invention, it is to be understood that I am to be limited only by the claims forming a part of this present application.

What I claim as new and desire to secure by Letters Patent of the U. S. is:—

1. The process of preserving biological material which consists in immersing the material in a bath comprising furfural as the active ingredient.

2. The process of preserving biological material which consists in immersing the material in a bath comprising a seven per cent solution of furfural.

3. The process of preserving biological material which comprises treating the material with a preservative comprising furfural.

4. Biological material embodying a preservative comprising furfural.

In witness whereof, I have hereunto subscribed my name.

CARL S. MINER.